United States Patent [19]

Kelley

[11] Patent Number: 5,107,385
[45] Date of Patent: Apr. 21, 1992

[54] READ HEAD ASSEMBLY FOR MULTIPLE-WIDTH TRACKS

[75] Inventor: G. Vinson Kelley, Santa Barbara, Calif.

[73] Assignee: Applied Magnetics Corporation, Goleta, Calif.

[21] Appl. No.: 438,263

[22] Filed: Nov. 16, 1989

[51] Int. Cl.$^5$ .................. G11B 5/39; G11B 5/127
[52] U.S. Cl. ..................................... 360/113
[58] Field of Search .............. 360/113, 123–124, 360/121, 110; 324/252

[56] References Cited

U.S. PATENT DOCUMENTS

| | | | |
|---|---|---|---|
| 4,280,158 | 7/1981 | de Niet | 360/113 |
| 4,535,375 | 8/1985 | Mowry et al. | 360/113 |
| 4,580,175 | 4/1986 | Mowry et al. | 360/113 |
| 4,617,600 | 10/1986 | Somers | 360/113 |
| 4,805,051 | 2/1989 | DeMarco et al. | 360/121 |
| 4,816,947 | 4/1989 | Vinal et al. | 360/113 |
| 4,851,944 | 7/1989 | Mowry | 360/113 |
| 4,907,114 | 3/1990 | Shiiki et al. | 360/113 |

*Primary Examiner*—John H. Wolff
*Attorney, Agent, or Firm*—Knobbe, Martens, Olson & Bear

[57] ABSTRACT

A read head assembly senses information recorded on magnetic media from tracks having different widths. The read head comprises a magnetoresistive strip which is positioned normal to the direction of movement of the magnetic media. In a preferred embodiment, the magnetoresistive strip includes two pairs of signal conducting leads, one pair of which has a lead spacing approximately equal to a first relatively narrow track width, and the other pair having a spacing approximately equal to a second, relatively wide track width.

19 Claims, 2 Drawing Sheets

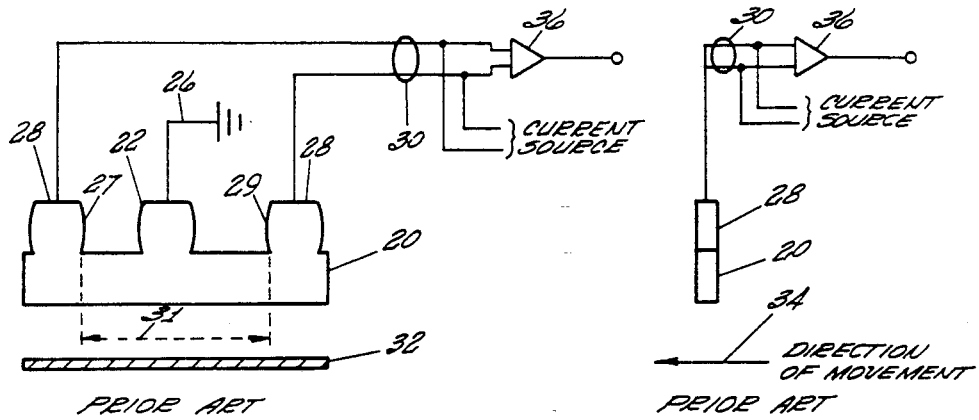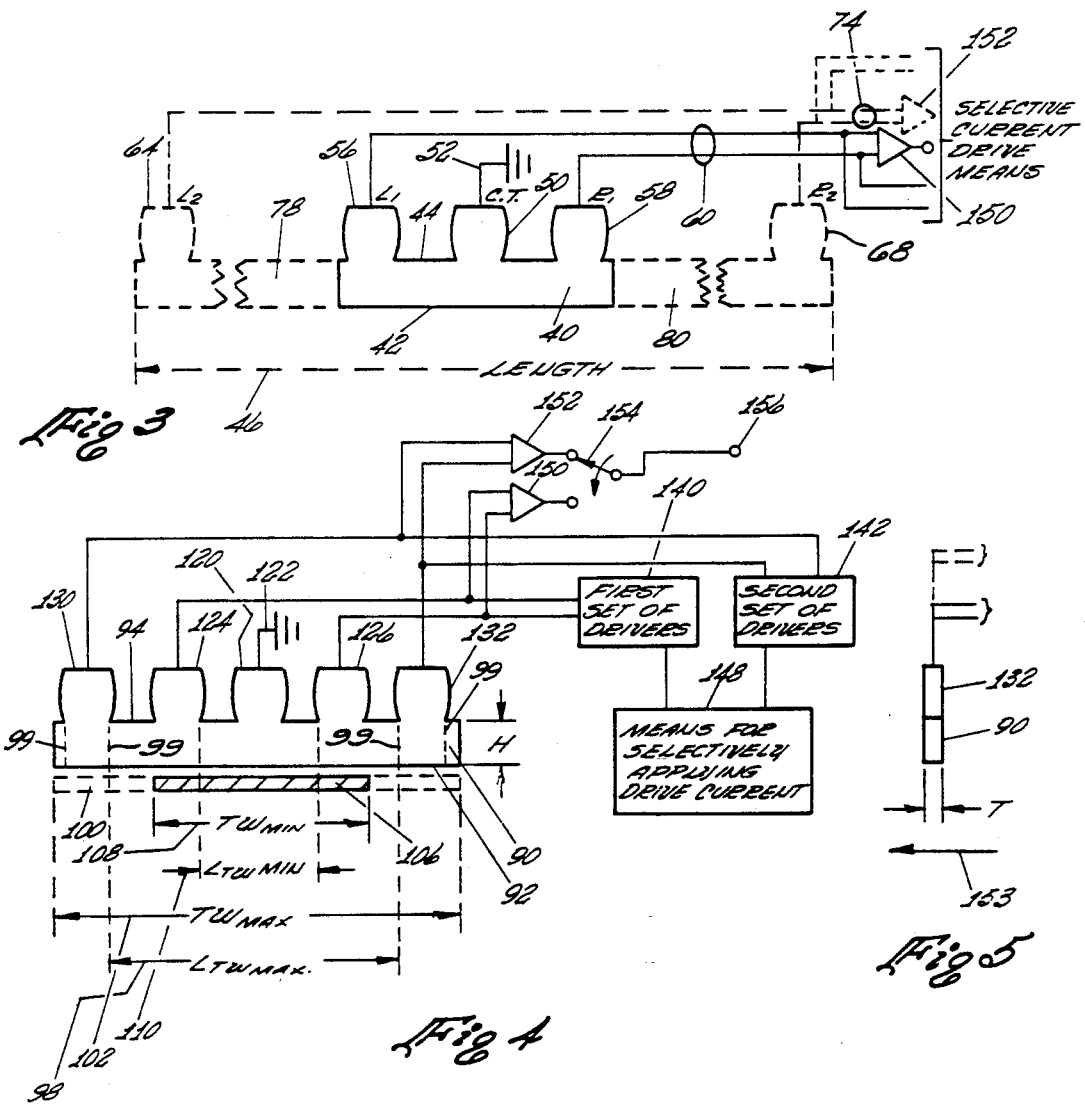

READ HEAD ASSEMBLY FOR MULTIPLE-WIDTH TRACKS

BACKGROUND OF THE INVENTION

The present invention relates to a read head assembly for sensing recorded information from tracks on moving magnetic media, such as magnetic tape, floppy disks or removable rigid disks, and, more particularly, to a magnetoresistive read head assembly for reading information from tracks having different track widths.

Recent advances in the art of magnetic data storage have resulted in improved storage densities. Typically, such improved storage densities are achieved by use of higher track densities in which the recorded information is stored in tracks narrower than those used previously. While it is usually not necessary for magnetic data storage drives to be able to write both the newer, high track density formats and the older, low track density formats, it is often desirable, for devices employing removable storage media, to be able to read both high and low track density formats. This capability to read both high and low track density formats may be referred to as "downward read capability."

In prior art magnetoresistive read heads, the dimensions of the active portion of the magnetoresistor correspond to the width of the track to be read. Due to the fixed dimensions of the active portion of the heads, these prior art devices are unsuitable for reading more than a single, fixed track width. Although it is theoretically possible to read a wide track width with a narrow track width head, such an arrangement produces low output voltages and a greater probability of dropout-induced errors. The low output voltage associated with narrow track width magnetoresistive heads can be compensated by increasing the current; however, this creates other problems, particularly heating of the magnetoresistive element. In addition, high current densities can cause electromigration in the magnetoresistive element. Further, high currents can cause stray fields from the magnetoresistive element of sufficient strength to erase the signal stored in the lower density medium. For some applications, particularly multi-track tape, heating is the limiting factor on the amount of current applied to the magnetoresistive element.

Accordingly, there is a need in the art for a single magnetic recording head which avoids the above problems while having the capability of reading tracks of various widths to provide downward read capability.

SUMMARY OF THE INVENTION

The present invention comprises a read head assembly for use in magnetic storage devices (such as tape drives or disk drives) which employ removable magnetic media, such as tapes or disks.

The read head assembly comprises a sensor element, such as a magnetoresistive strip, which extends in a direction that is transverse to the movement of a track of information recorded on the magnetic media. A circuit, connected to the sensor element, selectively activates selected sensing regions of the sensor element to read information on tracks having different track widths. Preferably, the circuit comprises two pairs of conductors connected to the sensor element at respective locations defined by two sets of conductor leads. The first set of conductor leads is spaced apart by a distance corresponding to a relatively narrow track, so as to define a relatively narrow sensing region of the sensor element. The second set of conductor leads is spaced apart by a distance corresponding to a relatively wide track, so as to define a relatively wide sensing region. In the preferred embodiment, the circuit includes drivers to selectively actuate the sensing regions for reading either the relatively narrow track or the relatively wide track. Sensing devices, which may comprise amplifiers, sense voltage variations between each set of leads to produce signals corresponding to information recorded on the magnetic media.

In use, a magnetic storage medium having a selected format (e.g., a high density format) is inserted into the storage device and the read head is electrically activated to sense a track width corresponding to this format. After reading such storage medium, a magnetic medium having a different format (e.g., a low density format) may be inserted into the device, and the read head is electrically altered to sense a track width corresponding to this format. In such manner, a single read head may be used to read at least two different track widths.

DESCRIPTION OF THE DRAWINGS

These and other features of the present invention may be more fully understood through reference to the drawings in which:

FIG. 1 is a schematic illustration of a prior art magnetoresistive head, showing an exemplary track of a recording medium, such as magnetic tape, positioned for sensing by the head;

FIG. 2 is a side view of the prior art magnetoresistive head of FIG. 1, showing the direction of movement of the magnetic medium relative to the head;

FIG. 3 is a schematic illustration of an embodiment of the magnetoresistive head assembly of the present invention, illustrating that the head assembly may comprise "n" number of pairs of signal conducting leads;

FIG. 4 is a schematic illustration of an embodiment of a magnetoresistive head assembly according to the present invention having two pairs of signal conducting leads, showing circuitry, in block diagram form, for selectively driving one or the other of the pairs of signal conducting leads for reading either of two different track widths on magnetic media disposed in sensing relationship to the head;

FIG. 5 is a side view of the magnetoresistive head of FIG. 4, schematically illustrating the direction of movement of the magnetic medium;

DESCRIPTION OF THE PREFERRED EMBODIMENT

Figure 6:
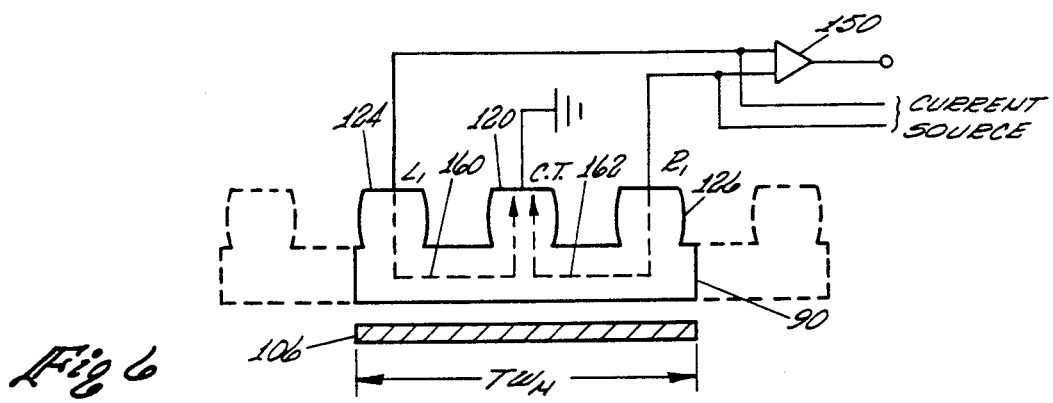
FIG. 6 is a schematic illustration of an embodiment of the magnetoresistive head of the present invention which utilizes a center tap, showing a circuit connected to read information from a relatively narrow track.

The read head assembly of the present invention transforms magnetically encoded data into electrical signals in a manner which is known in the prior art. As shown in FIG. 1 of the drawings, a typical prior art magnetoresistive read head includes a magnetoresistive strip 20 having a single pair of signal conducting leads 28. A center tap lead 22 is grounded by a ground 26. Electrical conductors 30 connect the signal conducting leads 28 to a current source which drives the magnetoresistive strip 20, and to a voltage sensing means, such as an amplifier 36 which senses changes in voltage across the magnetoresistive strip 20. A magnetic tape having a track of recorded information 32, is disposed adjacent to the magnetoresistive strip 20. The width of the track 32 is substantially equal to the width of the magnetoresistive strip 20, such that it spans at least the distance 31 between the inner edge 27 and inner edge 29 of the signal conducting leads 28.

As shown in FIG. 2, the longitudinal dimension of the magnetoresistive strip 20 is positioned normal to the direction of movement of the track 32, illustrated by the arrow 34.

One embodiment of the present invention is shown in FIG. 3. A magnetoresistive strip 40 is positioned normal to the direction of movement of a track of a magnetic medium. By way of example, the magnetic medium may be a tape mounted in a removable tape cartridge and the read head assembly may be mounted in a tape drive having an opening for inserting and removing the tape cartridge.

In the embodiment of FIG. 3, the magnetoresistive strip 40 has a transducing edge 42 which is disposed in transducing relationship with the magnetic tape. The magnetoresistive strip 40 also has a remote edge 44 which is spaced a predetermined distance from the transducing edge 42, thereby defining the height of the magnetoresistive strip 40. The magnetoresistive strip 40 has a length, shown by arrow 46, which extends in a direction normal to the movement of the magnetic media across the transducing edge 42. The length is greater than the minimum track width of magnetic medium from which information is to be sensed, and substantially equal to or smaller than the maximum track width of magnetic medium from which information is to be sensed. In this embodiment, a center tap lead 50, which is typically grounded, as shown by ground 52, is located on the remote edge 44 at the center of the magnetoresistive strip 40. The center tap lead 50 extends from the remote edge 44 in a direction away from the transducing edge 40.

At least two pairs of signal conducting leads are located on the remote edge 44 of the magnetoresistive strip 40. The first pair of signal conducting leads comprises a lead $L_1$, shown by reference numeral 56, on the left side of the center tap 50, and a corresponding lead $R_1$, shown by reference numeral 58, on the right side of the center tap 50. A second pair of signal conducting leads is shown by dashed lines to illustrate that any desired number of lead pairs may be used to accommodate the desired number of track widths to be read. One lead $L_2$ of the second pair of signal conducting leads is on the left side of the center tap 50 and the other lead $R_2$ is on the right side of the center tap 50. The lead $L_2$ is designated by reference numeral 64, and the lead $R_2$ is designated by reference numeral 68. The first and second pairs of leads are electrically connected to sensing and control electronics by line pairs 60, 74, respectively. The sensing and control electronics comprise (i) voltage amplifiers 150, 152, which sense the voltage drop across the line pairs 60, 74, respectively, and (ii) a means for selectively applying a driving current to the line pairs 60, 74, as illustrated in FIG. 3.

FIG. 4 shows an embodiment of the present invention which comprises a dual track width magnetoresistive read head assembly for selectively reading either of two different track widths of magnetic media. The narrower of the two track widths is designated in FIG. 4 by the reference numeral 106, while the wider of the two track widths is designated by the reference numeral 100. The narrower track 106 has a width $TW_{min}$ (shown by arrow 108) and the wider track 100 has a width $TW_{max}$ (shown by arrow 102). The magnetoresistive read head assembly includes a magnetoresistive strip 90 having a transducing edge 92 and a remote edge 94. It is envisioned that other embodiments having different signal conducting lead structure extensions could be used to provide a current flow through the leads and magnetoresistive strip. For example, as is well known in the art, the lead structures could be formed so as to overlap onto the face of the magnetoresistive strip, as indicated by the dashed lines 99 in FIG. 4.

The strip 90 has an inner pair of signal conducting leads 124, 126, an outer pair of signal conducting leads 130, 132 and a center tap lead 120. The inner pair 124, 126 and outer pair 130, 136 of leads are connected to a driving means and sensing means in a manner similar to that of FIG. 3. The center tap lead 120 is typically grounded, as shown by ground 122.

The outermost pair of signal conducting leads 130, 132 are utilized for sensing the information recorded on the larger track 100 of the magnetic media. The innermost set of signal conducting leads 124, 126 are utilized for sensing recorded information from the narrower track 106. By switching the current driving means and sensing means between the innermost pair 124, 126 and outermost pair 130, 132 of signal conducting leads, the effective length of the magnetoresistive strip can be varied to provide sensing regions corresponding to either the wider track 100 or the narrower track 106. When the inner pair 124, 126 of leads is used, the effective length of the strip 90 is equal to $L_{twmin}$ (shown by arrow 110), which corresponds to the narrower track 106. When the outer pair 130, 132 of leads is used, the effective length of the strip 90 is equal to $L_{twmax}$ (shown by arrow 98), which corresponds to the wider track 100.

In FIG. 4, the driving and sensing means includes a first set of drivers 140, a second set of drivers 142 and a means 148 for selectively applying a drive current to the drivers 140, 142. The first set of drivers 140 are electrically connected by lines to drive the inner set of signal conducting leads 124 and 126, and thereby activate the portion of the strip 90 between the leads 124, 126 to provide a sensing region corresponding to the narrower track 106. The second set of drivers 142 are electrically connected by lines to drive the outer set of signal conducting leads 130 and 132, and thereby activate the portion of the strip 90 between the leads 130, 132 to provide an extended sensing region for the wider track 100. The means for selecting applying a drive current 148 enables the drivers 140, 142 to selectively apply a drive current through either of the two pairs of signal conducting leads 124 and 126 or 130 and 132.

The magnetoresistive head assembly of FIG. 4 also includes signal sensing means which are electrically connected to each set of signal conducting leads. Specifically, the sensing means comprises an amplifier 150, electrically connected between leads 124 and 126 to sense voltage variations, and an amplifier 152, electrically connected between signal conducting leads 130 and 132 to sense voltage variations between these leads.

Each amplifier 150 and 152 has an output which is connected to a switch 154 having an output terminal 156. When reading the narrower track 106, the switch 154 is positioned to connect the amplifier 150 to the output terminal 156. The means 148 for selectively applying a drive current is enabled to drive the first set of drivers 140 to apply a drive current to the inner pair of signal conducting leads 124 and 126. The amplifier 150 senses voltage differences across the leads 124, 126 (which are representative of the information contained on the track 106), and produces an output signal for transmission through the switch 154 to the output terminal 156.

When reading the wider track 100, the switch 154 is positioned to connect the amplifier 152 to the output terminal 156. The second set of drivers 142 is enabled by the means 148 for selectively applying the drive current, and a drive current is applied across the outer pair of the signal conducting leads 130 and 132. The amplifier 152 senses the voltage differences across the leads 130, 132 and produces an output signal for transmission to output terminal 156.

FIG. 5 is a side view of the magnetoresistive strip 90 of FIG. 4, showing the right most signal conducting lead 132 and the thickness thereof, designated by "T." The direction of movement of the magnetic media relative to the strip 40 is shown by arrow 153. In the embodiment illustrated in FIGS. 4 and 5, all sets of the signal conducting leads and the center tap lead lie in the same plane.

Figure 7:
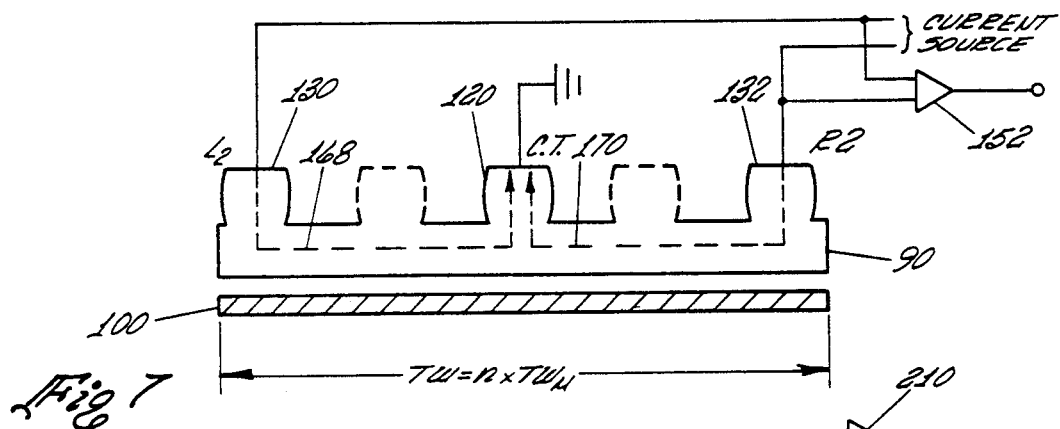
FIG. 7 is a schematic illustration of the magnetoresistive head of FIG. 6 showing a circuit connected to read information from a relatively wide track.

FIGS. 6 and 7 further illustrate the driving and sensing functions of the magnetoresistive strip 90 of FIG. 4. In FIG. 6, the track width being sensed is of the narrower track 106. The first set of drivers 140 (shown in FIG. 4) apply a drive current to signal conducting leads 124 and 126. The drive current flows into the leads 124, 126 and through the strip 90 to the grounded center tap 120, as illustrated by dashed arrows 160 and 162. The voltage across the active portion of the magnetoresistive strip 90 between the signal conducting leads 124 and 126 is sensed by the amplifier 150. The output of amplifier 150 represents recorded information sensed from the track 106.

FIG. 7 illustrates use of the magnetoresistive head assembly for sensing recorded information from the wider track 100. In the embodiment of FIG. 7, the second set of drivers 142 (shown in FIG. 4) applies a drive current to outer signal conducting leads 130 and 132. The current flows from the leads 130, 132 through the magnetoresistive strip 90, as shown by dashed arrows 168 and 170, to the center tap 120, which is grounded. The amplifier 152 is connected across leads 130 and 132, and produces an output signal representative of the recorded information on track 100.

Electrically, the variation of the voltage drop across leads $L_1$-$R_1$ and the second set of leads $L_2$-$R_2$ across the magnetoresistive strip is responsive to the recorded information on the track being selectively sensed.

Figure 8:
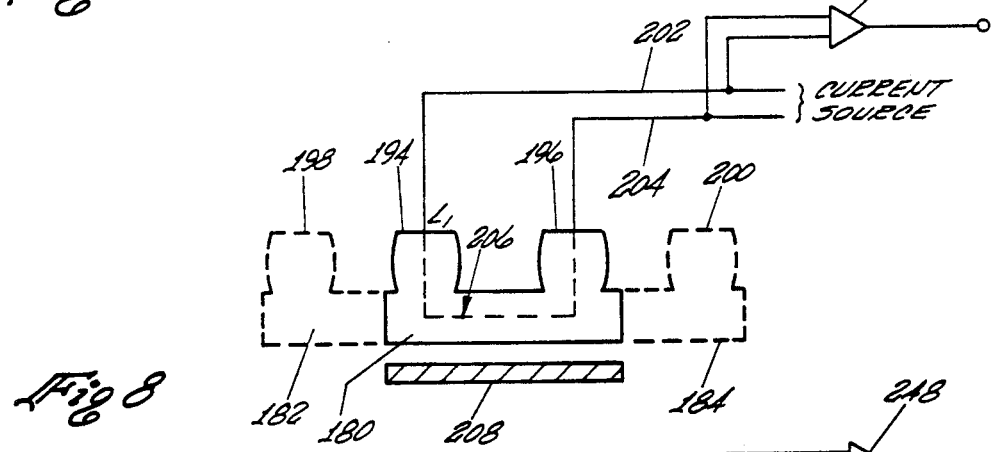
FIG. 8 is a schematic illustration of an embodiment of the magnetoresistive head of the present invention which does not utilize a center tap, showing a circuit connected to read information from a relatively narrow track.

FIG. 8 illustrates the driving and sensing functions of a magnetoresistive strip not having any center tap lead.

In the embodiment of FIG. 8, the magnetoresistive strip is utilized to sense information from a track 208 having a narrow width. The magnetoresistive strip includes a first set of signal conducting leads 194 and 196, which are electrically connected to the magnetoresistive strip to provide a sensing region 180 therebetween. A current is applied through lines 202 and 204 to the first set of signal conducting leads 194 and 196, causing a current flow therebetween, as shown by dashed line 206. A sensing device, such as an amplifier 210, is connected across signal conducting leads 202 and 204 to sense variations in the voltage of sensing region 180. The output signal from amplifier 210 represents the sensed, recorded information from track 208.

Figure 9:
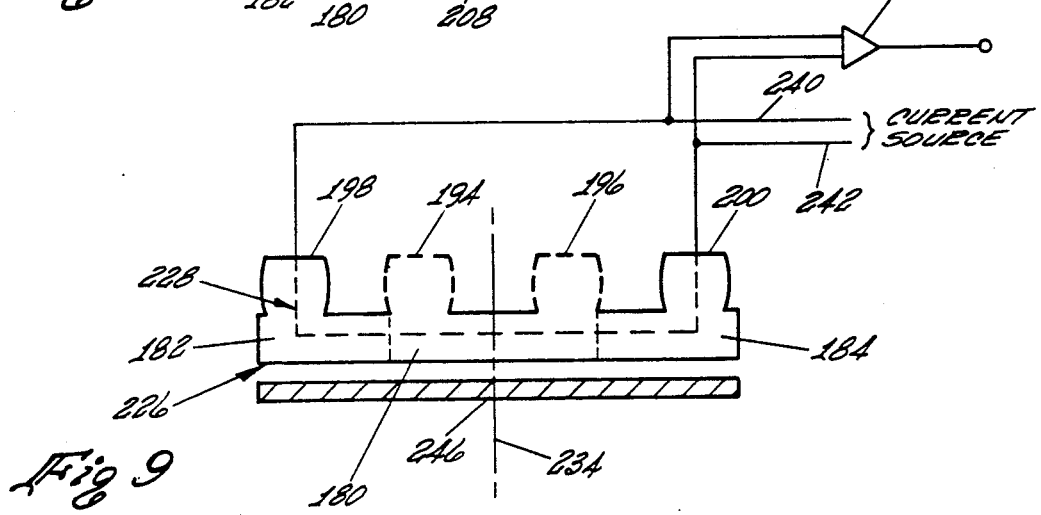
FIG. 9 is a schematic illustration of the magnetoresistive head of FIG. 8, showing a circuit connected to read information from a relatively wide track.

The magnetoresistive strip of FIG. 8 has additional sections, shown by dashed areas 182 and 184, which are typically not utilized when reading the narrower track 208. However, as shown in FIG. 9, these additional sections provide the magnetoresistive strip with the ability to sense information from magnetic media having wider tracks. In the embodiment of FIG. 9, the extended sections 182 and 184 include a second set of signal conducting leads 198 and 200. The extended sections 182 and 184 effectively lengthen the sensing region 180 to provide a longer sensing region 226 for reading a wider track 246. The signal driving means apply a drive current to signal conducting lead 198 and the current passes through the sensing region 180 to the other signal conducting lead 200. The current flow is illustrated by dashed lines 228. A sensing device, such as amplifier 248, is connected across leads 240 and 242 to sense the variations in voltages. In the embodiment of FIG. 9, the magnetoresistive strip has a center line, shown generally as 234, and the lead pairs of the magnetoresistive strip are symmetrically located with respect to the center line, such that the leads 240 and 242 are spaced from the centerline by the same distance and the leads 194 and 196 are spaced from the centerline by the same distance.

In the embodiments of FIGS. 6, 7, 8 and 9, the magnetoresistive strip is adapted to read either of two different track widths. However, it will be understood that virtually any number of sets of signal conducting leads could be utilized to accommodate the desired number of track widths from which recorded information is to be sensed. Thus, depending upon the number of pairs of signal conducting leads and the length of the magnetoresistive strip, a magnetoresistive read head assembly utilizing the teachings of the invention can be used to sense information from a wide variety of track widths.

The preferred application for the magnetoresistive read head is in a tape drive system which has a capability of reading different magnetic tapes each having a different track width. Those skilled in the art will, however, recognize that the invention is applicable to other types of recording media such as magnetic disks. Moreover, it is to be understood that the constructions illustrated above represent only presently preferred embodiments of the invention, and that various modifications and additions may be made to those embodiments without departing from the scope and spirit of the present invention.

What is claimed is:

1. In a magnetic storage device, a read head assembly for sensing information from tracks of different width on magnetic media, said read head assembly comprising:

a sensor element for sensing information recorded on tracks of magnetic media, said sensor element being comprised of a strip of material which is magnetically responsive to said magnetic media; and a circuit, connected to said sensor element, for selectively electrically activating first or second contiguous portions of said strip of magnetically responsive material corresponding to first or second track widths, respectively, thereby permitting said sensor element to read information from magnetic media having tracks of said first track width, or magnetic media having tracks of said second track width.

2. In a magnetic storage device, a read head assembly for sensing information from tracks of different width on magnetic media, said read head assembly comprising:

a sensor element for sensing information recorded on tracks of magnetic media; and a circuit, connected to said sensor element, for selectively electrically activating first or second portions of said sensor element corresponding to first or second track widths, respectively, thereby permitting said sensor element to read information from magnetic media having tracks of said first track width, or magnetic media having tracks of said second track width, said circuit comprising first and second pairs of conductors connected to said sensor element, at respective first and second pairs of locations, said first pair of locations being disposed between said second pair of locations.

3. The device of claim 2, wherein said locations are defined by conductor leads on said sensor element.

4. The device of claim 2, wherein said circuit comprises means for sensing voltage variations across said pairs of conductors.

5. The device of claim 4, wherein said means for sensing comprises an amplifier.

6. In a magnetic storage device, a read head assembly for sensing information from tracks of different width on magnetic media, said read head assembly comprising:

a sensor element for sensing information recorded on tracks of magnetic media, said sensor element comprising a magnetoresistive strip; and a circuit, connected to said sensor element, for selectively electrically activating first or second portions of said sensor element corresponding to first or second track widths, respectively, thereby permitting said sensor element to read information from magnetic media having tracks of said first track width, or magnetic media having tracks of said second track width.

7. In a magnetic storage device, a read head assembly for sensing information from tracks of different width on magnetic media, said read head assembly comprising:

a sensor element for sensing information recorded on tracks of magnetic media; and a circuit, connected to said sensor element, for selectively electrically activating first or second portions of said sensor element corresponding to first or second track widths, respectively, thereby permitting said sensor element to read information from magnetic media having tracks of said first track width, or magnetic media having tracks of said second track width, said circuit comprising drivers for selectively activating either said first portion or said second portion of said sensor element.

8. A method of reading information from magnetic storage media, comprising:

positioning a first storage medium having a first track width for sensing by a read head having a magnetoresistive strip;

relatively moving said first storage media and said read head to sense said information;

electrically altering said magnetoresistive strip of said read head to sense a second track width, different from said first track width;

positioning a second storage media having said second track width, different from said first track width, for sensing by said read head; and relatively moving said second storage media and said read head to sense said information.

9. A magnetoresistive read head for sensing recorded information from different moving magnetic media each of which has information recorded on a track wherein the track on each media has a different width, said magnetoresistive head comprising:

a magnetoresistive sensor adapted to be positioned normal to the direction of movement of a track on a selected one of the different moving magnetic media so as to be in a transducing relationship therewith, said magnetoresistive sensor having a magnetoresistive strip terminating in a first end and second end and extending in a direction normal to the movement of the selected one of the different magnetic media, said magnetoresistive strip having a geometrical dimension between said first end and said second end which is substantially equal to a maximum track width of information recorded on one of the different magnetic media from which information is to be sensed; and two pairs of signal conducting means operatively attached to the magnetoresistive strip wherein one pair of said two pairs of signal conducting means defines an inner sensing means having a selected distance therebetween which is substantially equal to a minimum track width of the different magnetic media from which information is to be sensed, and the other pair of said two pairs of signal conducting means defining an outer sensing means and spaced relative to each other so as to have said one pair of said two pairs of signal conducting means therebetween, said other pair of said two pairs of signal conducting means having a spacing therebetween which is greater than said selected distance and which is substantially equal to the maximum track width.

10. The magnetoresistive read head of claim 9, wherein said magnetoresistive strip has a transducing edge and a remote edge and wherein said two pairs of signal conducting means each have a signal conducting lead extension positioned adjacent to the remote edge and each of said signal conducting lead extensions are operatively connected across at least a portion of the magnetoresistive strip extending between the remote edge and the transducing edge.

11. The magnetoresistive read head of claim 9, further comprising:

a center tap lead operatively attached to the center of said magnetoresistive strip.

12. The magnetoresistive read head of claim 11, further comprising:

means for selectively applying a drive current through a selected pair of said two pairs of signal conducting means and said center tap lead for establishing current flow though the magnetoresistive strip wherein current flows through each one of the pair of said two pair of said signal conducting means to said center tap lead.

13. The magnetoresistive read head of claim 12, further comprising:
means operatively connected to a selected pair of said two pairs of signal conducting means for sensing voltage variations across the magnetoresistive strip.

14. The magnetoresistive read head of claim 13, wherein said sensing means includes at least one amplifier.

15. The magnetoresistive read head of claim 9, further comprising:
means for selectively applying a drive current through a selected pair of said two pairs of signal conducting means for establishing a current flow through the magnetoresistive strip.

16. The magnetoresistive read head of claim 9, further comprising:
means operatively connected to a selected pair of said two pairs of signal conducting means for sensing voltage variations across the magnetoresistive strip.

17. The magnetoresistive read head of claim 16, wherein said sensing means includes at least one amplifier.

18. The magnetoresistive read head of claim 9, further comprising:
sensing means operatively connected to each pair of said two pairs of signal conducting means for sensing voltage variations, said sensing means including means for producing a separate output signal for each pair of said two pair of signal conducting means and a switching means operatively connected to said sensing means for passing an output signal from a selected one of said two pair of signal conducting means.

19. The magnetoresistive read head of claim 18, wherein said sensing means includes an amplifier for each pair of said two pair of signal conducting means and wherein each amplifier produces electrical output signals and wherein said switching means includes input means for receiving the electrical output signal from each amplifier and includes enabling means for selectively passing one of said electrical output signals applied to the input means from each amplifier.

* * * * *

UNITED STATES PATENT AND TRADEMARK OFFICE
CERTIFICATE OF CORRECTION

PATENT NO. : 5,107,385
DATED : April 21, 1992
INVENTOR(S) : Kelley

It is certified that error appears in the above-indentified patent and that said Letters Patent is hereby corrected as shown below:

Column 9, line 4, change "flow though " to --flow through--.

Signed and Sealed this

Second Day of September, 1997

Attest:

BRUCE LEHMAN

*Attesting Officer*  *Commissioner of Patents and Trademarks*